United States Patent Office 3,078,308
Patented Feb. 19, 1963

3,078,308
PROCESS FOR THE PRODUCTION OF
ORGANOBORON COMPOUNDS
Herbert C. Brown, 1840 Garden St., West Lafayette, Ind.
No Drawing. Filed Aug. 31, 1959, Ser. No. 836,880
7 Claims. (Cl. 260—606.5)

The present invention is concerned with a method for preparing organoboron compounds, and is particularly concerned with a method whereby an organoboron compound is reacted with an unsaturated compound to form a different organoboron compound.

There have been methods proposed previously for the preparation of organoboron compounds, as, for example, the reaction of boron fluoride with a Grignard compound or the reaction of diborane with unsaturated compounds, particularly the olefins. These processes suffer particular disadvantages including the cost and the difficulty of effecting the reactions.

More recently, it has been proposed to react trialkylboron compounds with an olefin whereby a displacement reaction occurs so that an organoboron compound having alkyl groups analogous to the olefin employed is formed. This procedure is generally described in Belgian Patent 555,079. While the process provides an additional method for preparing organoboron compounds, particularly those which are only difficultly prepared by other methods, it still suffers certain disadvantages which are desirably to be overcome. For example, the displacement reaction is still a slow reaction requiring, in most instances, at least about 4 hours. The present invention is directed primarily to overcoming this particular deficiency in the reported process.

Accordingly, an object of this invention is to provide a new and novel process for the production of organoboron compounds. A particular object of the invention is to provide a process which produces organoboron compounds in a high yield and purity with faster reaction rates. A specific object is to provide a method for reacting an olefin with a trialkylboron by a more rapid reaction than heretofore available. These and other objects will be evident as the discussion proceeds.

It has now been found that a more rapid and efficient reaction of an organoboron compound, having at least one carbon-to-boron bonding and a straight chain hydrocarbon grouping of at least two carbon atoms, with an unsaturated compound is obtained when the reaction is conducted in the presence of a polyether or a cyclic ether. The temperature at which the reaction is conducted is generally at least about 100° C., but best operation is obtained at temperatures above about 140° C. The designated ethers, for some unexplained reason, promote and enhance the reaction rate so that the reaction proceeds more rapidly and smoothly. The lower alkyl ethers of diethylene glycol are especially effective for this purpose, particularly the dimethyl ether of diethylene glycol. The process is also particularly applicable to the treatment of trialkylborons wherein the alkyl groups have between about 2 to 8 carbon atoms with alpha-olefin materials having about 2 to 30 carbon atoms. Thus, a particular embodiment of the invention comprises the reaction of a trialkylboron in which the alkyl groups have between about 2 to 8 carbon atoms with an alpha-olefin material having about 2 to 30 carbon atoms in the presence of a lower alkyl ether of diethylene glycol, especially the dimethyl ether of diethylene glycol, at a temperature of at least 140° C. Other embodiments of the invention will be brought forth hereinafter.

A particular advantage of the process as briefly described above is that a more rapid and efficient reaction of the unsaturated compound with the organoboron compound is obtained than possible heretofore. Another advantage of the process is that it is conducted in a solvent which permits the integration of the present process with that of initially forming a trialkylboron reactant by reacting diborane with an olefin in the presence of the designated ethers. In the latter procedures, it has been found that this olefin addition to diborane proceeds very rapidly and effectively overcoming prior procedures. Thus, economies are effected with the over-all result of conducting a displacement reaction in the same solvent as employed in formation of the organoboron compound with both steps more efficiently and rapidly performed.

As indicated above, the present invention is predicated primarily on the finding that the polyethers and cyclic ethers promote the reaction of the organoboron compounds with unsaturated compounds to form different organoboron compounds. The polyethers and cyclic ethers are generally well known and a principal criteria of such materials are that they be non-reactive in the system, exclusive of complexing with the organoboron compound, and preferably liquid under the reaction conditions employed. Examples of the polyethers which are employed are those having the configuration

$$R-O-(CH_2)_n-O-R$$

wherein R is an organic radical, preferably hydrocarbon or ether radicals, and $n$ is a small whole number as between about 1 to 10, preferably 1 to 3 inclusive. For example, such polyethers include ethylene glycol ethyl methyl ether; the diethyl ether of ethylene glycol, methyl n-propyl ether of ethylene glycol; tetraethylene glycol dimethyl ether; glycerol trimethyl ether; dimethyl ether of diethylene glycol; dimethoxyethane, diethyl ether of diethylene glycol; and the like. Other polyethers which can be employed include, for example, pyrocatechol dimethyl ether; resorcinol dimethyl ether; 1,2,4-trimethoxybenzene, and the like. Typical examples of the cyclic ethers which are employable include tetrahydrofuran, 1,4-dioxane, furan and the like. The polyethers, particularly the lower alkyl ethers of diethylene glycol, are more especially preferred with dimethyl ether of diethylene glycol being a particularly advantageous ether resulting in the fastest reaction rates.

The organoboron compound is generally one that has at least one carbon-to-boron bonding with the organo radical having at least two carbon atoms so that when the displacement by the unsaturated reactant occurs, an olefinic material is liberated. Thus, the organic portion must have an alkyl configuration of at least two carbon atoms in length, but it is to be understood that the alkyl group can have further substituents on the second or other carbon atoms including radicals, such as alkenyl, cycloalkyl, cycloalkenyl, aryl, alkaryl, and acetylenic. The remaining valences of the boron atom are satisfied by similar or other organic radicals or by essentially inert ligands, such as the halogens, alcohol residues, and the like. Typical examples of the boron reactant include dimethylethylborane, triethylborane, tripropylborane, triisobutylborane, trioctylborane, diethylboron hydride, diethylboron chloride, diethylboron ethoxide, diethylphenylborane, diphenylethylborane, diethylcyclohexylborane, ethyldivinylborane, tri-(2-phenylethyl)borane, diethylcyclopentylborane, and the like. It is to be understood that the hydrocarbon groupings mentioned above can be further substituted with organic functional groups provided such are essentially inert in the reaction. Included among such functional groups are, for example, the halogens, keto groups, ester groups, and the like. For ease of operation and because of greater availability and handling, the trialkylboranes are preferred, especially those wherein the alkyl groups are hydrocarbon radicals having from 2 to 8 carbon atoms inclusively. Triethylborane comprises an especially preferred trialkylborane because of its economy, ease of formation, and the unique results obtained in the displacement reaction.

The unsaturated compound which is employed in the displacement reaction is intended to mean a compound which has one or more carbon-to-carbon double bonds or carbon-to-carbon triple bonds. This would, of course, not include aromatic materials since such are not ordinarily considered as unsaturated compounds. Typical examples of such unsaturated compounds are ethylene, propylene, cis- and trans-2-butene, 1-butene, 1-pentene, 2-pentene, 3-hexene, the octenes, 1-diisobutylene, trimethylethylene, tetramethylethylene, the decenes, 1-tetradecene, 1-octadecene; cyclic olefins such as: cyclopentene, cyclohexene, cycloheptene, pinene; substituted olefins such as: 1,1-diphenylethylene, p-nitrostyrene, p-carbethoxystyrene, styrene, 2-methylstyrene, methylmethacrylate, m-nitrostyrene, alpha-methylstyrene, beta-beta-diphenylethylene, nitroethylene, allylethylether, vinylbutyl ether; dienes such as butadiene and cyclohexadiene, and acetylenes such as 1-hexyne and 2-hexyne, acetylene and methyl acetylene; nitro olefins, halo olefins (e.g. allyl chloride), unsaturated ethers, unsaturated acid chlorides, unsaturated carboxylic esters and salts (e.g. ethyl oleate and sodium oleate), unsaturated borate esters, and the like. While it is evident from the above that, in general, any olefins or acetylenic materials are applicable in the process, it is preferable to employ the alpha-olefins, especially those having between about 2 to 30 carbon atoms inclusive. The alpha-olefinic materials, particularly hydrocarbon alpha-olefins, are more effective in the displacement reaction and are more economical and readily available.

The proportions of the reactants and ether employed in the process are subject to considerable latitude. However, it is desirable to have at least a slight excess of the olefin over the organoboron compound. Such excess can be even of the order of solvent quantities when the olefin is liquid under the reaction conditions as, for example, up to about 25 moles of olefin per mole of organoboron compound. Such excesses of the olefin further enhance the reaction rate. Likewise, the amount of the ether employed in the system can be varied considerably as about 1 to 100 parts per part by weight of the organoboron compound. Best results are obtained when the ether is present in an amount between about 1 to 10 parts per part by weight of the organoboron compound.

The process of this invention is readily accomplished by adding the organoboron compound and ether to a reactor, preferably accompanied with internal agitation, and one maintained under a blanket of inert gas, such as argon, nitrogen, and the like. The mixture is heated to the reaction temperature and the unsaturated material is charged in requisite amount, under pressure in those instances wherein it is a gaseous material. The operational techniques are obviously subject to considerable variation and the invention is not to be restricted by any particular mode of operation.

The present process will be more completely understood from a consideration of the following examples, wherein all parts are by weight.

EXAMPLE I

In order to demonstrate the effectiveness of the employment of the ethers in the displacement reaction, comparable tests were made with all variables being identical except for the diluent employed in the studies. The procedure involved adding 10.1 parts of trihexylborane, 16.0 parts of decene-1, and 37.8 parts of the indicated solvent in a fractionating column having a distilling head. The reaction mixture during these tests was maintained at 150° C. for a period of time such for 1-hexene to be liberated and reach the top of the column. This technique was used to establish the relative rates in the particular solvents employed; and the data obtained are reflected in the following table wherein the rate number is a relative value, and the higher the number the faster the reaction rate.

*Table I*

| Solvent | Hrs. required [1] | Relative rate |
| --- | --- | --- |
| Dimethyl ether of diethylene glycol | 3.5 | 6.8 |
| N,N-dimethylaniline | 7.2 | 3.4 |
| Decane | 24.6 | 1.0 |
| Amyl ether | 23.9 | 1.0 |

[1] For 1-hexene to reach the top of the column.

Additionally, for comparative purposes, 1.04 parts of trihexylborane were reacted with 36.7 parts of decene-1 (an excess of 35.1 parts) at 150° C. in an evacuated system and the pressure increase due to liberated 1-hexene noted at different time intervals. This procedure was repeated using 35.0 parts of the dimethyl ether of triethylene glycol to replace the excess decene-1 as solvent in the aforementioned run. The run using the indicated ether solvent was found to be 10 times faster than the run where the ether was not present.

From the above table, it is evident that the dimethyl ether of diethylene glycol is an excellent reaction promoter for the displacement reaction, being at least twice as effective as an amine and at least six times as effective as a hydrocarbon or a simple ether. Thus, the dimethyl ether of diethylene glycol shows a unique characteristic even over the simple ethers. It is also evident that the demethyl ether of triethylene glycol promotes the displacement reaction at least 10 times over that wherein only an excess of the olefin reactant is employed as a solvent. Similar results are obtained when other polyethers and cyclic ethers are compared and contrasted to other hydrocarbons, simple ethers, amines, and when conducting the reaction in the absence of a solvent or an excess of the olefin.

EXAMPLE II

To an autoclave reactor equipped with internal agitation, external heating means, and a means for admitting and discharging reactants and products, are added 1 part of triethylborane and 3 parts of dimethyl ether of diethylene glycol. The mixture is heated to 140° C., then 1-octene is added to the reactor. At the end of one hour's time, a high yield displacement takes place resulting in a solution of trioctylborane in dimethyl ether of diethylene glycol with the by-product ethylene being recovered as produced.

EXAMPLE III

When Example II is repeated with exception that octadecene-1 is substituted for octene-1 and the reaction temperature is maintained at 160° C. for 1½ hours, trioctadecylborane is produced in high yield and by-product 1-hexene is recovered as driven off from the reaction mixture.

EXAMPLE IV

When 10 parts of trioctylborane are reacted with 14 parts of dodecene-1 in the presence of 20 parts of the diethyl ether of diethylene glycol at 180° C. for 2 hours, essentially quantitative conversion to tridodecylborane is obtained. The octene-1 by-product is removed from the reaction system by distillation.

EXAMPLE V

To the reactor of Example I is added 4 parts of tripropylborane and 20 parts of dioxane. The mixture is agitated and heated to 100° C. Then, 7 parts of hexyne-1 are added to the mixture. The reaction mixture is maintained under these conditions for 2½ hours, continuously withdrawing propene-1 during the course of the reaction. In this manner, tri-1-hexenylborane is obtained in high yield.

EXAMPLE VI

Tricyclohexylborane is obtained in high yield when trin-hexylborane is reacted with cyclohexene in the presence of dibutyl ether of diethylene glycol at 150° C. for 3 hours.

EXAMPLE VII

When 10 parts of tri-n-butyl borane are reacted with 17 parts of styrene in 30 parts of the diethyl ether of ethylene glycol at 140° C. for 2 hours, tri-(2-phenylethyl)borane is obtained in high yield and recovered from the reaction system by fractional distillation.

EXAMPLE VIII

To the reactor of Example II is added 1 part of diethylboron chloride along with 5 parts of the methylethyl ether of diethylene glycol. Then, 4 parts of decene-2 are added to the reaction mixture and the mixture heated to 140° C. The temperature is maintained at 140° C. for 2 hours, and during the reaction period, by-product ethylene is removed from the reactor, and collected. Upon cooling the residue in the reactor, a solution of di-2-decylboron chloride in the methylethyl ether of diethylene glycol is obtained.

EXAMPLE IX

The reactor of Example II is employed. There is added to the reactor 1 part of dihexyl ethoxyboron and 4 parts of ethyl-methyl ether of ethylene glycol. The reaction mixture is heated to 140° C. and then ethylene is pressurized into the reactor at 50 p.s.i. These conditions are maintained for 2 hours. In this manner, diethyl ethoxyborane is obtained in high yield along with 1-hexene.

EXAMPLE X

The procedure of Example II is repeated with exception that an equivalent amount of butadiene is substituted for the octene-1. Tri-3-butenylborane is obtained in high yield and by-product ethylene is recovered.

EXAMPLE XI

When trihexylborane is reacted with octadecene-1, employing the dimethyl ether of triethylene glycol as a solvent at 150° C. for 2½ hours, trioctadecylborane is obtained in high yield.

EXAMPLE XII

When Example II is repeated with exception that trihexylborane is substituted for triethylborane and ethyl oleate is substituted for octene-1 with the reaction period at 2 hours, the ethyl oleate displaces the hexyl group and 1-hexene is obtained in high yield.

The above examples are presented by way of illustration and it is not intended that the invention be limited thereto. It will be evident that other organoboron compounds, unsaturated reactants, and ethers as described hereinbefore can be substituted with equally satisfactory results.

As briefly mentioned previously, the temperature to which the reaction is conducted is ordinarily at least 100° C. Likewise, the temperature is maintained below the decomposition point of the reactants or products. In a preferred embodiment, temperatures of at least 140° C. are employed since faster reaction rates and higher conversions are obtained. In order to avoid excessive decomposition and/or side reactions, the temperature is preferably also maintained below 200° C. The reaction system need not be pressurized, but such is generally desirable when the unsaturated reactant is gaseous. In this instance, only slight pressures are required, such as the autogenous pressure of the reaction system or pressures up to about 100 p.s.i. When the unsaturated reactant is a gaseous material, faster reactions rates are obtainable when employing the aforementioned slight pressures in the reaction system.

While the length of reaction time will understandably vary with the particular reactants employed, it is consistently faster when employing the designated ethers in the reaction system. The presence of the ethers results in essentially complete reaction regardless of the reactants employed within about 3 hours of reaction time.

The process of this invention is well suited to an overall integrated process wherein diborane is reacted with an unsaturated material in the presence of the aforementioned designated ethers to form a boron compound and the latter is then reacted with another unsaturated compound for displacement to take place and result in a different organoboron compound. Thus, it is possible, for example, to react a material such as ethylene with diborane in the presence of the designated ethers which proceeds very rapidly, and then react the triethylborane formed in the system with, for example, octadecene-1 to produce trioctadecylborane. This over-all process results in a particularly rapid formation of the desired organoboron compound and higher conversion. The reaction of the unsaturated compound with diborane in the designated ethers involves generally reacting the two materials at a temperature up to about 100° C. The reaction mixture is then heated to the temperatures indicated above to perform the displacement reaction of the present invention.

The following example will illustrate such an integrated procedure.

EXAMPLE XIII

Employing the reactor of Example II, 16.6 parts of diborane are reacted with 300 parts of 1-hexene at room temperature in the presence of 200 parts of the dimethyl ether of diethylene glycol for about 10 minutes. Then, the reaction mixture is heated to 140° C. and decene-1, 504 parts, is added to the reactor and the system maintained at this temperature for one hour. Tridecylborane is obtained in high yield and the 1-hexene by-product is recovered for recycle in forming more trihexylboron starting material.

It will be evident that other unsaturated compounds described hereinbefore can be reacted with diborane in the presence of the aforementioned ethers at temperatures up to about 100° C. and the organoborane product so-formed can be reacted with other unsaturated organic compounds described above in order to form a different organoboron compound and liberate the alpha-olefin.

The organoboron comounds formed according to the process of this invention are of considerable and well-known utility. For example, they can be employed as so-called alkylating materials. Typical examples of this use is the reaction of triethylboron with lead chloride to produce tetraethyllead. They are also useful in the formation of alcohols. For example, the products of Example III or IV can be oxidized with hydrogen peroxide to produce the corresponding borate which can then be hydrolyzed to form respectively, octadecanol and dodecanol. Likewise, the product of Example XII can be oxidized and hydrolyzed to form the corresponding difunctional hydroxyacid compound. Other uses of the products obtained will be evident.

Having thus described the process of this invention, it is not intended to be limited except as set forth in the following claims.

I claim:

1. In a process which comprises reacting a hydrocarbon boron compound, wherein the hydrocarbon group has at least two carbon atoms and is liberated as an olefin when displaced by an unsaturated hydrocarbon defined hereinafter, with an unsaturated hydrocarbon selected from the group consisting of olefins having between about 2 to 30 carbon atoms, cycloolefins, and alkynes at a temperature of at least 100° C., the improvement which comprises conducting the reaction in the presence of an ether catalyst selected from the group consisting of polyethers and cyclic ethers.

2. The process of claim 1 wherein the ether is a polyether.

3. The process of claim 2 wherein the polyether is the dimethyl ether of diethylene glycol.

4. The process which comprises reacting triethylborane with octadecene-1 at a temperature of at least 140° C. in the presence of the dimethyl ether of diethylene glycol.

5. The process of claim 1 wherein said hydrocarbon boron compound is a trialkylborane and said unsaturated hydrocarbon is an alpha-olefin.

6. The process which comprises reacting trihexylborane with decene-1 at a temperature between about 140 to 200° C. in the presence of the dimethyl ether of diethylene glycol.

7. The process of claim 2 further defined in that the trialkylborane employed is tripropylborane, the alpha-olefin employed is 1-pentene, and the ether employed is the dimethyl ether of diethylene glycol.

References Cited in the file of this patent
UNITED STATES PATENTS 2,886,599     Koster _____ May 12, 1959

OTHER REFERENCES

Carpenter: ARS Journal, vol. 29, page 11 (Jan. 1959).